US007885050B2

(12) United States Patent
Lee

(10) Patent No.: US 7,885,050 B2
(45) Date of Patent: Feb. 8, 2011

(54) AMPLIFICATION RELAY DEVICE OF ELECTROMAGNETIC WAVE AND A RADIO ELECTRIC POWER CONVERSION APPARATUS USING THE ABOVE DEVICE

(75) Inventor: Hyung-Joo Lee, Andong (KR)

(73) Assignee: JC Protek Co., Ltd. (KR)

( * ) Notice: Subject to any disclaimer, the term of this patent is extended or adjusted under 35 U.S.C. 154(b) by 559 days.

(21) Appl. No.: 11/572,410

(22) PCT Filed: Jul. 29, 2005

(86) PCT No.: PCT/KR2005/002468

§ 371 (c)(1),
(2), (4) Date: Jan. 19, 2007

(87) PCT Pub. No.: WO2006/011769

PCT Pub. Date: Feb. 2, 2006

(65) Prior Publication Data

US 2008/0266748 A1    Oct. 30, 2008

(30) Foreign Application Priority Data

Jul. 29, 2004    (KR)    ...................... 10-2004-0059562

(51) Int. Cl.
*H02H 1/00*    (2006.01)
(52) U.S. Cl. ...................................................... 361/113
(58) Field of Classification Search ................. 361/113
See application file for complete search history.

(56) References Cited

U.S. PATENT DOCUMENTS 2,611,094 A * 9/1952 Rex ............................... 334/4
4,403,347 A * 9/1983 Iso et al. ................... 455/193.1

2003/0048254 A1   3/2003   Huang

FOREIGN PATENT DOCUMENTS

CN    1447954 A    10/2003

(Continued)

OTHER PUBLICATIONS

Chinese Intellectual Property Office, The First Office Action, Dec. 18, 2009.

(Continued)

*Primary Examiner*—Stephen W Jackson
(74) *Attorney, Agent, or Firm*—Park & Associates IP Law LLC

(57) ABSTRACT

The present invention provides an amplifying repeater, which is constructed in such a manner that a ferrite core is inserted into a coil with a pre-determined number of winds to increase an induced electromotive force caused by an increase in flux linkage using a time-varying magnetic field of electromagnetic waves at a position distant from various electromagnetic wave generating sources by a predetermined distance and the induction coil and a variable condenser for inducing resonance are connected to each other to increase current while reducing a resistant component existing in the induction coil to intensify and amplify the magnetic field of electromagnetic waves. Furthermore, the present invention provides a wireless power conversion charging device using the magnetic field of electromagnetic waves, which is located between an electromagnetic wave generating source transmitter and a receiving coil or attached to the transmitter and receiving coil. The wireless power conversion charging device includes a rectifying diode for rectifying an electromotive force induced in a construction in which a resonance and impedance matching variable condenser is connected to a coil in series or in parallel in order to transmit maximum induced power to a charging battery that is a load using electromagnetic waves amplified by the amplifying repeater, and a smoothing condenser for smoothing the rectified voltage. Accordingly, charging power required for various small power electronic devices can be provided and power can be supplied to various loads.

12 Claims, 3 Drawing Sheets

FOREIGN PATENT DOCUMENTS

| | | |
|---|---|---|
| CN | 1185599 C | 1/2005 |
| EP | 0533247 | 9/1992 |
| JP | H03-98432 A | 4/1991 |
| JP | 10-257697 | 9/1998 |
| JP | 10-295043 A | 11/1998 |
| JP | H11-188113 A | 7/1999 |
| JP | 2002-508916 A | 3/2002 |
| JP | 2003-088005 | 3/2003 |
| KR | 10-2002-0080591 A | 10/2002 |
| KR | 10-2004-0052878 A | 6/2004 |

OTHER PUBLICATIONS

Korean Intellectual Property Office, Notification of Reasons for Refusal, Sep. 1, 2006.

Korean Intellectual Property Tribunal The 9th Division, Trial Decision, Nov. 30, 2007.

Japanese Patent Office, Notification of Reasons for Refusal, Sep. 7, 2010.

* cited by examiner

[Fig. 1]
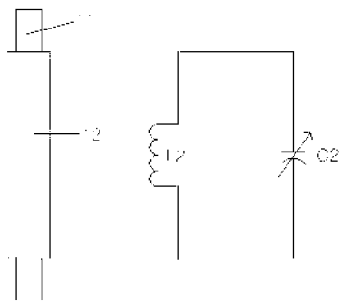
[Fig. 2]
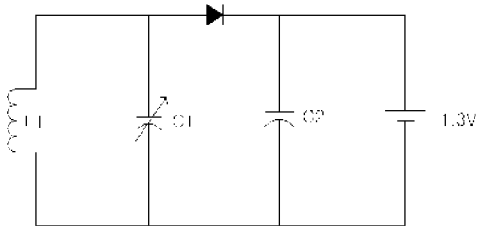
[Fig. 3]
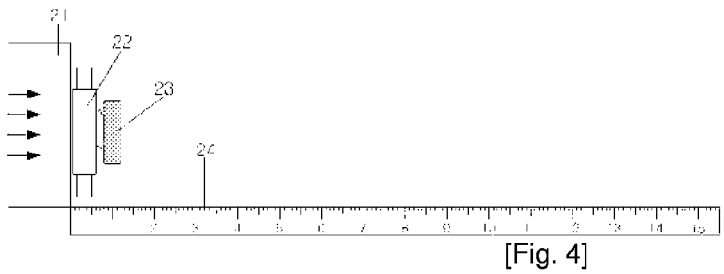
[Fig. 4]
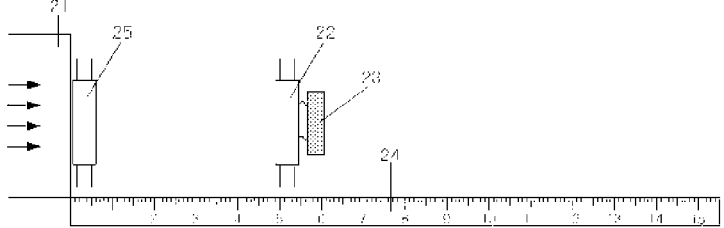
[Fig. 5]
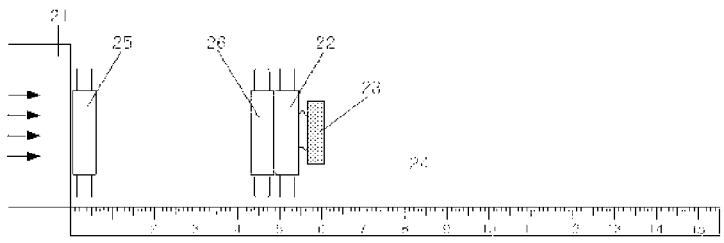
[Fig. 6]
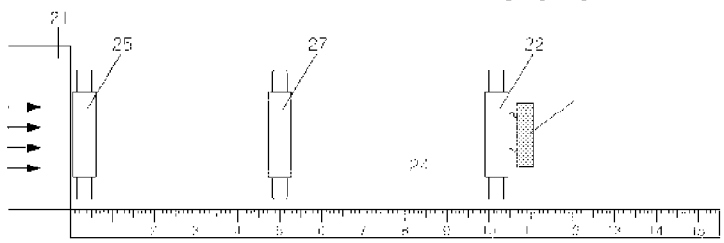

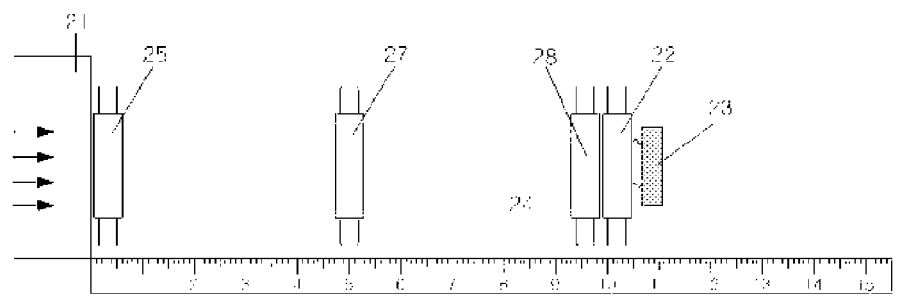
[Fig. 7]
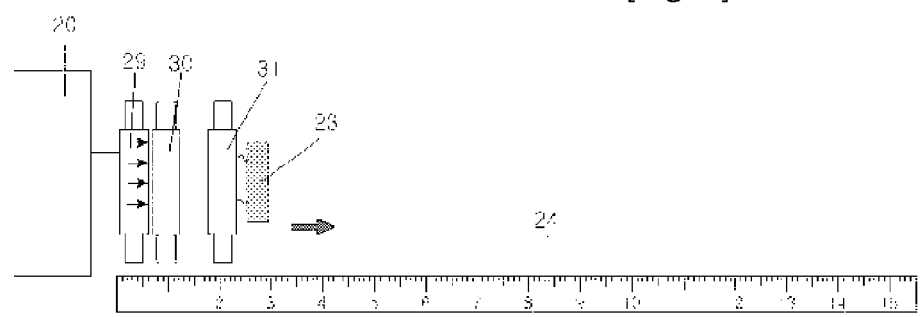
[Fig. 8]
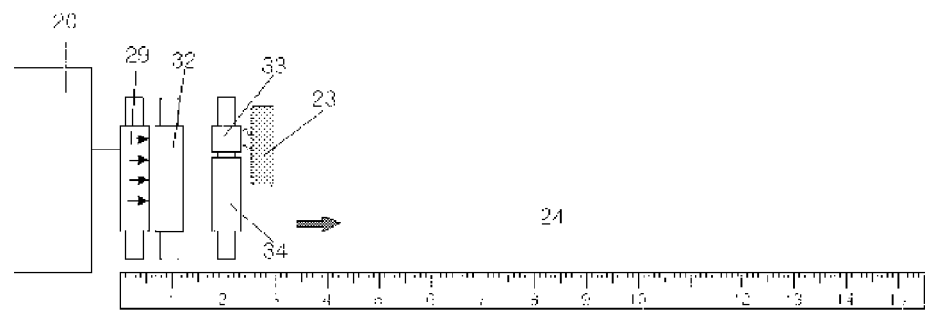
[Fig. 9]
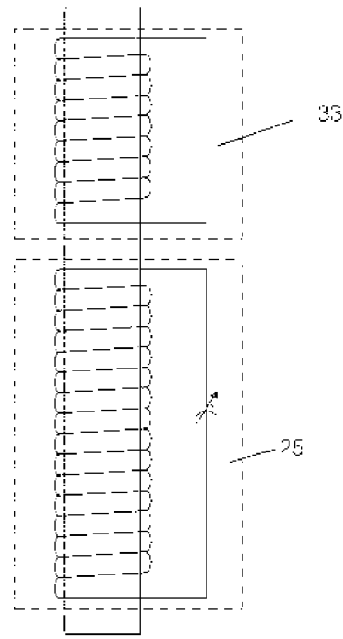
[Fig. 10]

[Fig. 11]
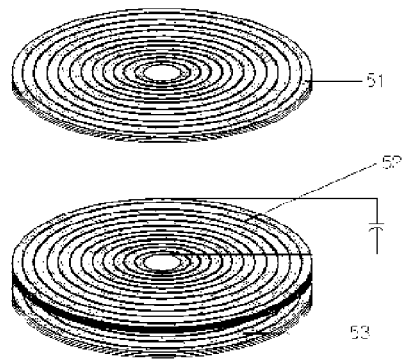
[Fig. 12]
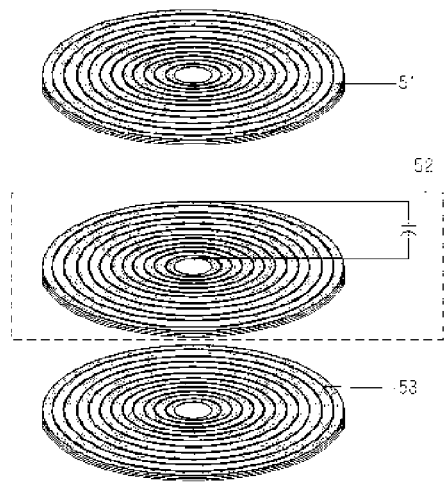
[Fig. 13]
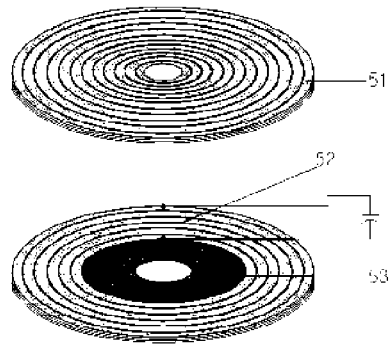
[Fig. 14]
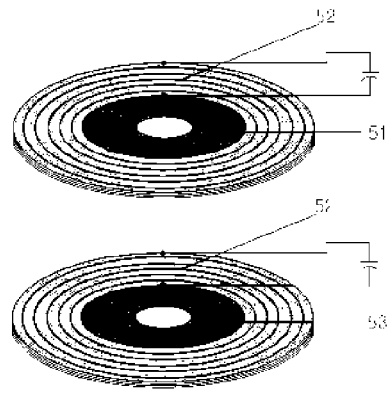

US 7,885,050 B2

AMPLIFICATION RELAY DEVICE OF ELECTROMAGNETIC WAVE AND A RADIO ELECTRIC POWER CONVERSION APPARATUS USING THE ABOVE DEVICE

TECHNICAL FIELD

The present invention relates to an amplifying repeater, which is constructed in such a manner that a ferrite core is inserted into a coil with a predetermined number of winds to increase an induced electromotive force caused by an increase in flux linkage using a time-varying magnetic field of electromagnetic waves at a position distant from an electromagnetic wave generating source by a predetermined distance, and that the coil and a variable condenser for inducing resonance are connected to each other to intensify and amplify the magnetic field of electromagnetic waves, and a wireless power converter using electromagnetic waves, which is located at a predetermined distance from the amplifying repeater, connects a resonance and impedance matching variable condenser to a coil to effectively transmit an induced power to a load, and rectifies and smoothes the induced power using a diode to supply the power to a charging battery or various loads.

BACKGROUND ART

The induced electromotive force obtained from a time variation of the magnetic field of electromagnetic waves using Faraday's law is generated in proportion to the number of winds of an induction coil and a time variation of flux linkage. However, the intensity of the magnetic field is abruptly decreased in response to a distance from an electromagnetic wave generating source. Thus, the induced electromotive force is hardly induced to the induction coil at more than a predetermined distance so that energy according to wireless power conversion cannot be obtained. Furthermore, the induction coil must be disposed within a very short range from the electromagnetic wave generating source in a prior art so that its installation position is greatly restricted or it cannot be installed because of its bad appearance.

DISCLOSURE OF INVENTION

Technical Problem

Accordingly, the present invention has been made in view of the above mentioned problem, and it is an object of the present invention to provide an electromagnetic wave amplifying repeater, which is constructed in such a manner that a ferrite core is inserted into a coil with a predetermined number of winds to increase an induced electromotive force caused by an increase in flux linkage using a time-varying magnetic field of electromagnetic waves at a position distant from an electromagnetic wave generating source by a predetermined distance, connect the induction coil to a variable condenser for inducing resonance to construct an amplifying repeater that maximizes a current while reducing a resistant component existing in the induction coil to intensify and amplify the magnetic field of electromagnetic waves, and to provide a wireless power converter using the amplifying repeater, which includes a rectifying diode for rectifying an electromotive force induced in a structure in which a resonance and impedance matching variable condenser is connected in parallel with a coil to effectively transmit an induced electromotive force using the electromagnetic waves amplified by the amplifying repeater, having a predetermined distance from the amplifying repeater, and a smoothing condenser for smoothing the rectified voltage.

Another object of the present invention is to provide an amplifying repeater located at a very short distance from an electromagnetic wave generating source or attached to a wireless power converter to intensify and amplify the magnetic field of electromagnetic waves such that the amplifying repeater is installed unrestrictedly and an amplifying repeater and wireless power converter are applied in various ways according to wireless power conversion using the amplified electromagnetic waves.

Technical Solution

To achieve the above objects, according to the present, there is provided an electromagnetic wave amplifying repeater capable of amplifying and repeating the magnetic field of electromagnetic waves generated artificially or generated from various electromagnetic wave generating sources, including: an induction coil formed by winding a coil with a predetermined thickness in a desired size and form by a pre-determined number of winds; a magnetic substance having a predetermined size and form, the magnetic substance being combined with the induction coil to increase flux; and a variable condenser connected to the induction coil to construct a resonance circuit.

BRIEF DESCRIPTION OF THE DRAWINGS

Further objects and advantages of the invention can be more fully understood from the following detailed description taken in conjunction with the accompanying drawings, in which:

FIG. 1 illustrates the appearance and configuration of an amplifying repeater according to the present invention;

FIG. 2 illustrates a wireless power converter having a charging function according to the present invention;

FIG. 3 illustrates a construction for measuring a charging voltage, a charging current and a charging power using only a wireless power converter without using an amplifying repeater;

FIG. 4 illustrates a construction for measuring a charging voltage, a charging current and a charging power using a single magnetic field amplifying repeater and a wireless power converter;

FIG. 5 illustrates a construction for measuring a charging voltage, a charging current and a charging power using two magnetic field amplifying repeaters and a wireless power converter (combined with one of the amplifying repeaters);

FIG. 6 illustrates a construction for measuring a charging voltage, a charging current and a charging power using two magnetic field amplifying repeaters and a wireless power converter (independent);

FIG. 7 illustrates a construction for measuring a charging voltage, a charging current and a charging power using magnetic field amplifying repeaters, a repeating amplifier and a wireless power converter, which are combined with each other;

FIG. 8 illustrates a construction in which a transmission coil generates a magnetic field, and a voltage, current and power are measured using an amplifying repeater, a receiving coil and a wireless power converter;

FIG. 9 illustrates a construction in which a transmission coil generates a magnetic field, and a voltage, current and power are measured at an output terminal using an amplifying repeater, a receiving coil wound on the upper part of a common core, and an amplifying repeater disposed at the lower part of the common core;

FIG. 10 illustrates a transmitter and a receiver constructed in such a manner that an amplifying repeater and a transmission coil or a receiving coil are wound around a single core;

FIG. 11 illustrates a construction in which an amplifying repeater composed of a spiral coil is attached onto a spiral coil, and a voltage, current and power are measured at an output terminal of a receiving coil;

FIG. 12 illustrates a construction in which an amplifying repeater composed of a spiral coil is located between a transmission coil and a receiving coil, and a voltage, current and power are measured at an output terminal;

FIG. 13 illustrates a construction in which an amplifying repeater is located outside a transmission coil, and a voltage, current and power are measured at an output terminal of a receiving coil; and FIG. 14 illustrates a construction in which an amplifying repeater is located outside each of a transmission coil and a receiving coil, and a voltage, current and power are measured at an output terminal of the receiving coil 11; Core, 12; Inducing Coil
20; AC Power Generator
21; Electromagnetic Wave Generating Source
22; Receiver 23; Output Part
24; Ruler
25,26,27,28,30,32,34; Amplifying Repeater
29; Transmission Coil
31; Receiver1, 33; Receiving Coil
51; Spiral Coil Type Receiving Coil
52; Spiral Coil Type Amplifying Repeater
53; Spiral Coil Type Transmission Coil
L1: Receiving Coil,
C1: Condenser for Impedance Matching,
C2: Smoothing Condenser,
1.3V: Battery Voltage for Charging

MODE FOR THE INVENTION

The present invention will now be described in detail in connection with preferred embodiments with reference to the accompanying drawings. For reference, like reference characters designate corresponding parts throughout several views.

The present invention provides an amplifying repeater, which is constructed in such a manner that a ferrite core is inserted into a coil with a predetermined number of winds to increase an induced electromotive force caused by an increase in flux linkage using a time-varying magnetic field of electromagnetic waves using Faraday's law at a position distant from an electromagnetic wave generating source by a predetermined distance and the induction coil and a variable condenser for inducing resonance are connected to each other to maximize an induced current while reducing a resistant component existing in the induction coil to amplify the magnetic field of electromagnetic waves. Furthermore, the present invention provides a wireless power converter located at a predetermined distance from the amplifying repeater or attached to the amplifying repeater. The wireless power converter includes a rectifying diode for rectifying an electromotive force induced in a construction in which a magnetic core such as a ferrite core is inserted in an induction coil with a predetermined number of winds for transmitting maximum induced power to a charging battery that is a load using electromagnetic waves amplified by the amplifying repeater and the induction coil is connected to a variable condenser for controlling resonance and impedance matching, a smoothing condenser for smoothing the rectified voltage, and a receiving coil having a predetermined DC voltage and current.

In receiving electromagnetic power using Faraday's law, the present invention amplifies the magnetic field of time-varying electromagnetic waves generated in a television receiver or a monitor or electromagnetic waves artificially generated by connecting a transmission coil to a load of an AC power generating circuit using an amplifying repeater to obtain an induced electromotive force using an induction coil at a position distant from an electromagnetic wave generating source by a predetermined distance and maximizes the obtained induced voltage and current, to thereby provide a magnetic field amplifying repeater for receiving electromagnetic power, which enables high efficiency electric energy conversion, and a high efficiency wireless power converter using the amplifying repeater.

The construction of the amplifying repeater for amplifying an induced magnetic field of electromagnetic waves will now be described.

The electromagnetic wave amplifying repeater according to the present invention obtains an induced electromotive force using electromagnetic waves generated from an electromagnetic wave generating source and emits the obtained induced power to the air. The present invention winds a coil round a bobbin having a predetermined diameter and size (having an internal diameter of 10 mm and an external diameter of 15 mm) by a predetermined number of times and a ferrite core is inserted in the bobbin to manufacture an induction coil. The diameter and the number of winds of the induction coil and the size of the ferrite core are designed such that the induced electromotive force is maximized. The induction coil can be constructed in parallel or in series in consideration of its resistance value. In the present invention, the diameter and length of the ferrite core are 9 mm and 110 mm, respectively, and two induction coils each have a diameter of 0.3 mm and a number of winds of 160 are connected in parallel with each other. The induction coils are wound round the aforementioned bobbin, the ferrite core is inserted into the bobbin and a variable condenser is connected in parallel with the induction coils to construct a resonance circuit to maximize induced power and emit electromagnetic waves.

The wireless power converter according to the present invention is located at a pre-determined distance from the amplifying repeater or attached to the amplifying repeater and includes a ferrite core having a diameter of 9 mm and a length of 110 mm and two induction coils having a diameter of 0.3 mm and a number of winds of 100, connected in parallel with each other. The induction coils are wound round a bobbin having a predetermined size (an internal diameter of 10 mm and an external diameter of 15 mm), the ferrite core is inserted into the bobbin and a variable condenser is connected in parallel with the induction coils to impedance-match with a resonance and load electronic circuit to maximize an induced electromotive force. The wireless power converter further includes a diode for rectifying the induced electromotive force and a smoothing condenser for smoothing the rectified voltage. The wireless power converter can be used as a power supply of a charging device because it generates a DC voltage having a specific current.

FIG. 1 illustrates the electromagnetic field amplifying repeater manufactured according to the present invention on the left and a circuit constructing the amplifying repeater on the right. FIG. 2 is a circuit diagram of the wireless power converter constructed to obtain an electric energy using electromagnetic waves amplified by the amplifying repeater. In FIG. 2, L1 denotes a receiving coil, C1 represents a capacitor for impedance matching of resonance and maximum power transmission, C2 denotes a smoothing capacitor, and 1.3V represents a charging battery voltage. Table 1 represents a charging voltage, a charging current and a charging power obtained when the wireless power converter of FIG. 2 is located having a predetermined distance from an electromagnetic wave generating source 21, as shown in FIG. 3, without using the electromagnetic field amplifying repeater. From Table 1, it can be known that the charging current and charging power are hardly induced when the distance of a ruler 24 exceeds 4 cm.

TABLE 1

A charging voltage, a charging current and a charging power Using the wireless power converter in FIG. 2.

| Distance(cm) | Charging Voltage(V) | Charging Current (mA) | Charging Power(mW) |
|---|---|---|---|
| 0 | 1.3 | 87 | 35.1 |
| 1 | 1.3 | 18.4 | 83.9 |
| 2 | 1.3 | 10.7 | 13.9 |
| 3 | 1.3 | 4 | 5.2 |
| 4 | 1.3 | 0 | 0 |

FIG. 4 illustrates a construction in which a single electromagnetic field amplifying repeater 25 designed and manufactured according to the present invention is located in proximity to the electromagnetic wave generating source 21 and a charging voltage, a charging current and a charging power are measured using a receiver wireless power converter according to the present invention while varying the distance between the electromagnetic field amplifying repeater and the wireless power converter. The measurement result is represented in Table 2. Referring to Table 2, the charging current and charging power can be obtained even at a point at which the distance of the ruler is approximately 10 cm.

TABLE 2

A charging voltage, a charging current and a charging power Using the wireless power converter in FIG. 4.

| Distance(cm) | Charging Voltage(V) | Charging Current (mA) | Charging Power(mW) |
|---|---|---|---|
| 5 | 1.3 | 44.0 | 57.2 |
| 6 | 1.3 | 26.2 | 34.1 |
| 7 | 1.3 | 21.7 | 28.2 |
| 8 | 1.3 | 15.7 | 20.4 |
| 9 | 1.3 | 10.7 | 13.9 |
| 10 | 1.3 | 4.9 | 6.4 |
| 11 | 1.3 | 0 | 0 |
| 12 | 1.3 | 0 | 0 |

FIG. 5 illustrates a construction using two electromagnetic field amplifying repeaters 25 and 26 according to the present invention. One of the amplifying repeaters is located having a predetermined distance from the electromagnetic wave generating source 21 and the other one is disposed in proximity of the receiver 22 and the wireless power converter. Here, the amplifying repeater 26 and the receiver 22 are combined with each other. Table 3 represents a charging voltage, a charging current and a charging power measured using this construction while varying the distance between the electromagnetic wave generating source and the amplifying repeater 26 and the receiver 22 attached to each other. Referring to Table 3, the charging current and charging power can be obtained even at a point distant from the electromagnetic wave generating source 21 by 12 cm.

TABLE 3

A charging voltage, a charging current and a charging power Using the wireless power converter in FIG. 5.

| Distance(cm) | Charging Voltage(V) | Charging Current (mA) | Charging Power(mW) |
|---|---|---|---|
| 5 | 1.3 | 51.2 | 66.5 |
| 6 | 1.3 | 36.8 | 47.8 |
| 7 | 1.3 | 29.2 | 37.9 |
| 8 | 1.3 | 21.4 | 27.8 |
| 9 | 1.3 | 16.6 | 21.5 |
| 10 | 1.3 | 12.7 | 16.5 |
| 11 | 1.3 | 4.7 | 6.1 |
| 12 | 1.3 | 1.2 | 1.6 |

FIG. 6 illustrates a construction using two electromagnetic field amplifying repeaters 25 and 27 designed and manufactured according to the present invention. In this construction, one of the amplifying repeaters is located having a predetermined distance from the electromagnetic wave generating source 21, the other one is disposed having a distance of 5 cm from the electromagnetic wave generating source 21, and a charging voltage, a charging current and a charging power are measured using the wireless power converter while varying the distance between the wireless power converter and the amplifying repeaters. Table 4 represents the measurement result. Referring to Table 4, a slightly increased charging power can be obtained and a specific charging current and charging power can be obtained even at a point distant from the electromagnetic wave generating source 21 by 13 cm.

TABLE 4

A charging voltage, a charging current and a charging power Using the wireless power converter in FIG. 6.

| Distance(cm) | Charging Voltage(V) | Charging Current (mA) | Charging Power(mW) |
|---|---|---|---|
| 10 | 1.3 | 34 | 44.2 |
| 11 | 1.3 | 22.3 | 29.0 |
| 12 | 1.3 | 6.3 | 8.2 |
| 13 | 1.3 | 1.7 | 2.2 |

FIG. 7 illustrates a construction in which an electromagnetic field amplifying repeater 25 is manufactured in such a manner that a coil having the same diameter as the aforementioned coil is wound round a bobbin having the same size as the afore-mentioned bobbin by a number of winds of 200 to connect two induction coils in parallel, a ferrite core is inserted into the induction coils and a variable condenser is connected in parallel with the induction coils to construct a resonance circuit, and the amplifying repeater 25 is located having a predetermined distance from the electromagnetic wave generating source 21. In addition, another amplifying repeater 27 identical to those used in FIGS. 3, 4, 5 and 6 is located at a point corresponding to 5 cm of the ruler, and an amplifying repeater 28 and the wireless power converter are attached to each other to measure a charging voltage, a charging current and a charging power while varying the distance between the electromagnetic wave generating source and the wireless power converter. Table 5 represents the measured charging voltage, charging current and charging power. It can be known from Table 5 that a specific charging current and charging power can be obtained even at a point distant from the electromagnetic wave generating source 21 by 16 cm.

TABLE 5

A charging voltage, a charging current and a charging power Using the wireless power converter in FIG. 7.

| Distance(cm) | Charging Voltage(V) | Charging Current (mA) | Charging Power(mW) |
|---|---|---|---|
| 10 | 1.3 | 41.0 | 53.3 |
| 11 | 1.3 | 29.8 | 38.7 |
| 12 | 1.3 | 20.2 | 26.2 |
| 13 | 1.3 | 15.8 | 20.5 |
| 14 | 1.3 | 10.7 | 13.9 |
| 15 | 1.3 | 3.2 | 4.1 |
| 16 | 1.3 | 1 | 1.3 |

Various experiments were made using the electromagnetic field amplifying repeater designed and manufactured as above and the wireless power converter according to the present invention, as shown in FIGS. 3 through 7. In the case where only the wireless power converter is installed without having the amplifying repeater, as shown in FIG. 3, the induced electromotive force is hardly generated from the induction coil when the wireless power converter is located distant from the electromagnetic wave generating source by 4 cm, as represented in Table 1. Thus, a charging current does not flow in a charging battery that is a load and charging battery power indicates zero. In the case where the amplifying repeater is added, as shown in FIG. 4, the maximum charging current of 44 mA and charging power of 57.2 mW are obtained when the wireless power converter is located distant from the electromagnetic wave generating source by 5 cm and charging power of 6.4 mW is obtained when the wireless power converter is located distant from the electromagnetic wave generating source by 10 cm, as represented in Table 2.

When the wireless power converter is combined with the amplifying repeater, as shown in FIG. 5, the charging current and charging power are higher than those obtained from the construction of FIG. 4 at the same distance. When the two amplifying repeaters are used as shown in FIG. 6, the charging power at the point distant from the electromagnetic wave generating source by 10 cm is 44.2 mW as represented in Table 4, which is approximately seven times the charging power of 6.4 mW obtained using only one amplifying repeater in FIG. 4. Furthermore, the charging current and charging power can be obtained even at a point distant from the electromagnetic wave generating source by a distance corresponding to 12 cm of the ruler. Thus, it can be known that electromagnetic power is transmitted and induced-converted into an electrical energy to be transmitted to a load even at a distance four times the distance when the wireless power converter is used without using any amplifying repeater.

In the construction in which two different amplifying repeaters 25 and 27 are installed and the amplifying repeater 28 is combined with a receiving coil and the wireless power converter, as shown in FIG. 7, increased charging current and charging power are measured at the same distance in the construction having no amplifying repeater of FIG. 6 and a distance capable of obtaining the charging current and charging power is increased to 16 cm, as represented in Table 5.

In another embodiment of the present invention, a transmission coil is connected to a load of an AC power generating circuit of a TV receiver, which is an artificial electromagnetic generating source, to construct a source of generating AC power waveform having a frequency of 130 kHz, and the transmission coil, a repeater and coils used in first and second receivers are constructed, as shown in Table 6, to measure a receiving voltage, a receiving current and a receiving power in response to a ruler distance using the wireless power converter of FIG. 2.

TABLE 6

Coil Construction of Transmission coil, Repeater, Receiver1, Receiver2

| | Transmission Coil | Repeater | Receiver1 | Receiver2 |
|---|---|---|---|---|
| Coil | 0.3 | 0.3 | 0.3 | 0.3 |
| Core(mm) (Dia.*Length) | 9*55 | 7*45 | 7*45 | 7*45 |
| No. of winding | 40회 | 40회 | 15 | Upper Receiver(10Times) Lower Repeater(40Times) |

In Table 6, the first receiver is constructed of a general solenoid coil constructed such that a coil is wound round a core and the second receiver includes a receiving coil wound round the upper part of a common core ten times and a repeater constructing a resonance circuit of a coil wound round the lower part of the common core forty times and a capacitor.

FIG. 10 illustrates a transmitter and a receiver constructed by winding a transmission coil outputting power generated from the electromagnetic wave generating source or a receiving coil receiving electromagnetic waves round a common core provided with an electromagnetic wave amplifying repeater. This construction can obtain high wireless power conversion efficiency because it can maximize generation and reception of electromagnetic waves in the resonance circuit of the amplifying repeater.

Table 7 represents the voltage, current and power measured at an output load terminal (tens of parallel LEDs) of a receiver 31 when a transmission coil 29, an amplifying repeater 30 and the receiver 31 manufactured as shown in Table 6 are installed as shown in FIG. 8. The amplifying repeater is located in proximity to an electromagnetic wave generating source. The voltage, current and power are measured while moving the receiver from the electromagnetic wave generating source to distances 5 cm, 10 cm and 15 cm.

TABLE 7

A receiving voltage, current and power measured at an output load terminal of a receiver1.

| Distance(cm) | Receiving voltage (V) | Receiving Current (A) | Receiving Power(W) |
|---|---|---|---|
| 5 | 3.9 | 1.900 | 7.410 |
| 10 | 2.6 | 1.000 | 2.600 |
| 15 | 1.4 | 0.200 | 0.280 |

Table 8 represents the voltage, current and power measured at an output load terminal of receivers 33 and 34 when the transmission coil 29, amplifying repeater 32 and receivers 33 and 34 manufactured as shown in Table 6 are installed as shown in FIG. 9. The amplifying repeater is located in proximity to an electromagnetic wave generating source. The voltage, current and power are measured while moving the receivers from the electromagnetic wave generating source to distances 5 cm, 10 cm, 15 cm and 20 cm.

TABLE 8

A receiving voltage, current and power measured
at an output load terminal of a receiver2.

| Distance(cm) | Receiving voltage (V) | Receiving Current (A) | Receiving Power(W) |
|---|---|---|---|
| 5 | 4.6 | 3.500 | 16.100 |
| 10 | 4.4 | 3.500 | 15.400 |
| 15 | 2.7 | 1.700 | 4.590 |
| 20 | 2.0 | 0.700 | 1.400 |

It can be known from Tables 7 and 8 that the receiving voltage, receiving current and receiving power in response to a distance are much larger when they are obtained using the receiver 31 manufactured by winding only an induction coil round a core than when they are obtained using the receivers 33 and 34 including an induction coil and a repeater constructed of a resonance circuit, which are attached to a single common core.

Another embodiment of the present invention constructs induction coils by winding coils having various diameters round bobbins having various sizes by different numbers of winds in consideration of the size and scale of an electromagnetic wave generating source, connects the induction coils in series or in parallel, inserts ferrite cores having diameters and lengths fitted into the internal diameters of the bobbins, and connects the induction coils to a variable condenser to construct a resonance circuit. In this manner, an electromagnetic field amplifying repeater can be constructed in various sizes and forms and an apparatus capable of obtaining charging voltage, charging current and charging power with various levels can be realized using the amplifying repeater and the wireless power converter.

Another embodiment of the present invention constructs a transmission coil, a repeater and a receiver using the spiral structure disclosed in Korean Patent Application No. 10-2004-0000528 applied by the Applicant. In this case, an electromagnetic wave generating source that generates a voltage of AC 220V and 60 Hz converted into an AC voltage waveform having a frequency of 120 kHz through an AC-AC adapter is connected to the transmission coil in a spiral form, a receiving coil is connected to a charging circuit, and a received charging current and voltage are measured. The distance between the transmission coil and the receiving coil is 5 cm. FIG. 11 shows a case where the amplifying repeater is located on the transmission coil in proximity to the transmission coil. Table 9 represents the internal diameters, external diameters, types and numbers of winds of the spiral transmission coil, repeater coil and receiving coil.

TABLE 9

Internal diameters, external diameters, types and numbers of winds
of the spiral transmission coil, repeater coil and receiving coil.

| | Internal diameters (mm) | External diameters (mm) | Coil spec. | Numbers of winds |
|---|---|---|---|---|
| Receiving coil | 30 | 80 | 0.2*9 | 24 |
| Repeater coil | 30 | 80 | 0.2*9 | 24 |
| Transmission coil | 30 | 40 | 0.2*9 | 4 |

In FIG. 11, transmission power output through the transmission coil of the electromagnetic wave generating source is 16 W, charging voltage measured by the wireless power converter of FIG. 2 is 1.4V, charging current is 0.36 A, and charging power is 0.50 W. When the amplifying repeater is located between the transmission coil and the receiver, which are spiral coils having the dimension represented in Table 6, as shown in FIG. 12, charging voltage is 1.4V, charging current is 0.4 A and charging power is 0.56 W. In this case, current and power slightly higher than those obtained in the case of FIG. 11 can be obtained. For reference, when only the transmission coil 53 and receiving coil 51 are used without using the repeater and the distance between the transmission coil and the receiving coil is 5 cm, charging voltage is 1.4V, charging current is 0.01 A and charging power is 0.014 W, which are very small.

FIG. 13 shows a case where the amplifying repeater surrounds the transmission coil. Here, the repeater is not connected to the transmission coil through wire. Table 10 represents the internal diameters, external diameters, types and numbers of winds of the spiral transmission coil, repeater and receiver used in the construction shown in FIG. 13.

In FIG. 13, transmission power output through the transmission coil of the electromagnetic wave generating source is 16 W, charging voltage measured by the wireless power converter of FIG. 2 is 1.4V, charging current is 0.9 A, and charging power is 1.26 W. When the amplifying repeaters respectively surround the transmission and receiving coils, which are spiral coils having the dimension of Table 10, as shown in FIG. 14, charging voltage is 1.4V, charging current is 1.0 A and charging power is 1.4 W. That is, the highest current and power can be obtained in the experiments using the spiral coils. Here, the distance between the transmission coil and the receiving coil is 5 cm.

TABLE 10

Internal diameters, external diameters, types and numbers of winds
of the spiral transmission coil, repeater coil and receiving coil.

| | Internal diameters (mm) | External diameters (mm) | Coil spec. | Numbers of winds |
|---|---|---|---|---|
| Receiving coil | 30 | 80 | 0.2*9 | 24 |
| Repeater coil | 40 | 80 | 0.2*9 | 20 |
| Transmission coil | 30 | 40 | 0.2*9 | 4 |

Furthermore, the present invention can construct a wireless charging device that generates an induced voltage and current with high efficiency and charges the induced voltage and current in a charger using a rectifying diode and a smoothing condenser by simultaneously winding two wires of the spiral coil disclosed in Korea Patent Application No. 10-2004-0000528 in the form of plate such that they are located in parallel vertically, placing a ferromagnetic substance in a doughnut shape on the coil in order to increase flux caused by flux linkage per hour and connecting a variable condenser to the coil in series or in parallel to construct a resonance circuit. Here, an electromagnetic field amplifying repeater can be manufactured by constructing the resonance circuit using the spiral plate type coil, ferromagnetic substance in a doughnut shape and variable condenser. A method of manufacturing the electromagnetic field amplifying repeater is described in detail in Korea Patent Application No. 10-2004-0000528.

The present invention constructs a magnetic field amplifying repeater for amplifying a magnetic field at a position having a predetermined distance from an electromagnetic wave generating source and locates an electromagnetic wave amplifying repeater and a wireless power conversion charging device converter at a position distant from the amplifying repeater by a predetermined distance. The wireless power conversion charging device include a rectifying diode that rectifies an electromotive force induced in a structure in which a resonance and impedance matching variable condenser and a coil are connected in parallel with each other to induce maximum power using electromagnetic waves amplified by the amplifying repeater to transmit the induced power to a load and a smoothing condenser smoothing the rectified voltage and a wireless power. Accordingly, the present invention can repeat power to a predetermined distance from the electromagnetic wave generating source and convert electromagnetic power to improve industrial applicability. For example, the present invention can be used to charge contactless wireless battery or transmit power in real time at a short distance in the air or an insulator of a small power electronic device.

The present invention can locate the magnetic field amplifying repeater at a position having a predetermined distance from the electromagnetic wave generating source to install the wireless power converter using electromagnetic waves, and thus the wireless power converter can be freely located and applied in various ways.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An electromagnetic wave amplifying repeater comprising:
   an induction coil formed by winding a coil with a predetermined thickness in a desired size and form by a predetermined number of winds;
   a magnetic substance having a predetermined size and form, the magnetic substance being combined with the induction coil to increase flux; and
   a variable condenser connected to the induction coil to form a closed circuit so as to construct a resonance circuit,
   wherein the induction coil is configured to have a flux linkage with magnetic field of electromagnetic waves generated artificially or generated from various electromagnetic wave generating sources,
   wherein the electromagnetic wave amplifying repeater is configured to amplify and repeat the magnetic field of the electromagnetic waves in the induction coil, and
   wherein the amplified and repeated electromagnetic waves in the induction coil is adapted to be picked up wirelessly by and used in a wireless power converter.

2. The electromagnetic wave amplifying repeater as claimed in claim 1, wherein the induction coil wound by the predetermined number of winds is designed and manufactured in a solenoid or spiral form.

3. The electromagnetic wave amplifying repeater as claimed in claim 1, wherein the magnetic substance combined with the induction coil to increase flux is a ferrite core or a substance having magnetism.

4. The electromagnetic wave amplifying repeater as claimed in claim 3, wherein induction coils wound by a predetermined number of winds are connected in series or in parallel to control the resistance and inductance of the induction coils, to thereby effectively generate the magnetic field of electromagnetic waves.

5. The electromagnetic wave amplifying repeater as claimed in claim 4, wherein the variable condenser constructing the resonance circuit is connected to the induction coil in series or in parallel to amplify the magnetic field of electromagnetic waves.

6. A wireless power converter comprising:
   an electromagnetic wave amplifying repeater including an induction coil formed by winding a coil with a predetermined diameter in a desired size and form by a predetermined number of winds, a magnetic substance, and a variable condenser, the electromagnetic wave amplifying repeater serving to amplify and repeat the magnetic field of electromagnetic waves generated artificially or generated from various electromagnetic wave generating sources;
   an induction coil and a magnetic substance for picking up wirelessly the magnetic field amplified by the amplifying repeater and generating an induced electromotive force;
   a variable condenser for performing resonance and impedance matching, the variable condenser being connected to the induction coil to improve power conversion efficiency;
   a rectifying diode for rectifying a voltage induced by the induction coil and the variable condenser; and
   a condenser for smoothing the voltage to form a voltage having a desired DC component,
   wherein the electromagnetic wave amplifying repeater is connected to other elements of the wireless power converter not physically, but wirelessly.

7. The wireless power converter as claimed in claim 6, wherein induction coils wound by a predetermined number of winds are connected in series or in parallel to control the resistance and inductance of the induction coils, to thereby improve power conversion efficiency.

8. The wireless power converter as claimed in claim 6, wherein the amplifying repeater is attached to an electromagnetic wave generating source transmission coil and a receiving coil or to one of the electromagnetic wave generating source transmission coil and the receiving coil, and at least one amplifying repeater is installed between the electromagnetic wave generating source transmission coil and the receiving coil in consideration of the distance between the electromagnetic wave generating source and the receiving coil.

9. The wireless power converter as claimed in claim 8, wherein the amplifying repeater and the receiving coil are designed and manufactured in a solenoid or spiral form.

10. The wireless power converter as claimed in claim 6, wherein the amplifying repeater and the wireless power converter including the amplifying repeater further comprise an electromagnetic wave generating source to which a spiral or solenoid transmission coil artificially generating electromagnetic waves is attached.

11. The wireless power converter as claimed in claim 6, wherein the wireless power converter is constructed in such a manner that an induction coil is wound round one side of a core wound by a transmission coil of an artificial electromagnetic wave generating source and the induction coil is connected to a capacitor to construct an amplifying repeater, that an induction coil is wound round one side of a core wound by a receiving coil and the induction coil is connected to a capacitor to construct an amplifying repeater, or that amplifying repeaters are respectively set at both sides of the core of the transmission coil and receiving coil.

12. The wireless power converter using an electromagnetic wave amplifying repeater as claimed in claim 6, wherein the wireless power converter is constructed in such a manner that a spiral coil is wound round the outside of a transmission spiral coil of an artificial electromagnetic wave generating source and connected to a capacitor to construct an amplifying repeater, that a spiral coil is wound round the outside a receiving spiral coil and connected to a capacitor to construct an amplifying repeater, and that spiral coils are respectively wound around the outsides of transmission and receiving spiral coils and connected to a capacitor to construct an amplifying repeater.

* * * * *